June 28, 1960

R. E. SCHWARTZ 2,942,623

HEIGHT CONTROL VALVE

Filed Nov. 7, 1957

INVENTOR:
ROBERT E. SCHWARTZ

By Gravely, Lieder, Woodruff & Wilkes

ATTORNEYS

INVENTOR:
ROBERT E. SCHWARTZ

By Gravely, Lieder, Woodruff & Wills
ATTORNEYS.

INVENTOR:
ROBERT E. SCHWARTZ

By Gravely, Lieder, Woodruff & Wille
ATTORNEYS.

United States Patent Office 2,942,623
Patented June 28, 1960

2,942,623

HEIGHT CONTROL VALVE

Robert E. Schwartz, University City, Mo., assignor to Wagner Electric Corporation, St. Louis, Mo., a corporation of Delaware Filed Nov. 7, 1957, Ser. No. 695,027

2 Claims. (Cl. 137—627.5)

This invention relates to pneumatic suspension systems and in particular to a height control valve employed therein.

An object of the present invention is to provide a height control valve having a "neutral travel" for regulating time delay incorporated in the valving which obviates any manual adjusting mechanism.

Another object of the present invention is to provide a height control valve having simplified, self-aligning valving along with a simplified actuating means therefor.

Still another object of the present invention is to provide a height control valve which obviates high pressure seals adjacent the hydraulic portion thereof.

Still another object of the present invention is to provide a height control valve which is economically manufactured lending itself readily to right or left hand use.

These and other objects and advantages will become apparent hereinafter.

Briefly, the present invention is embodied in a control valve mechanism including an oscillatable member carrying a yieldable torque connection in contact with a rotatable shaft and also having movement dampening means associated therewith whereby rotation of said shaft causes said yieldable torque connection to apply a relatively constant force for a predetermined period of time to effect movement of said oscillatable member which is responsive to controllably actuate a cooperating unitary valve stem in order to provide communication between either inlet and working ports or working and exhaust ports.

The invention also consists in the parts and in the arrangement and combination of parts hereinafter described and claimed. In the accompanying drawings which form a part of this specification and wherein like numerals refer to like parts wherever they occur:

Figure 1:
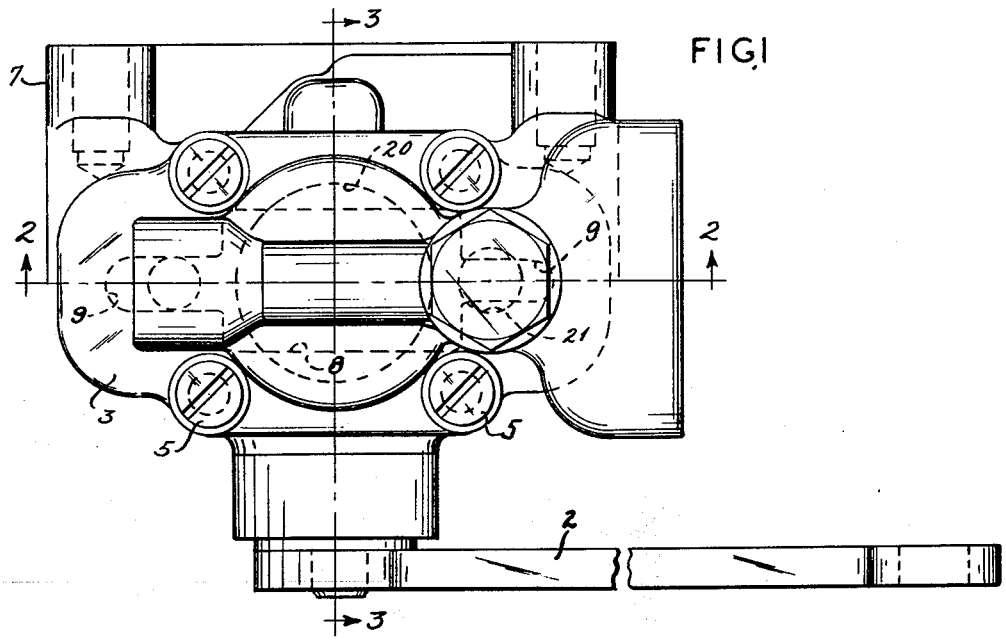
Fig. 1 is an elevational view of the preferred embodiment of the present invention.

In reference to the drawings, it is well known in the automotive art that height control valves are employed to regulate the fluid pressure in air springs (not shown) which are interposed between two relatively movable members (not shown), a sprung mass or vehicle frame, and an unsprung mass or vehicle axle in order to maintain the sprung mass a predetermined distance from the unsprung mass; and, the instant height control valve 1 is adapted to be attached to the sprung mass while the actuating or control arm 2 therefor is adapted to be attached to the unsprung mass.

The height control valve 1 is provided with an upper and lower housing 3 and 4, respectively, which are sealably connected by suitable means, such as studs 5, having a gasket 6 interposed therebetween; and the housing 4 is provided with an integrally formed mounting flange 7 for attachment with the sprung mass, as above mentioned.

Figure 2:
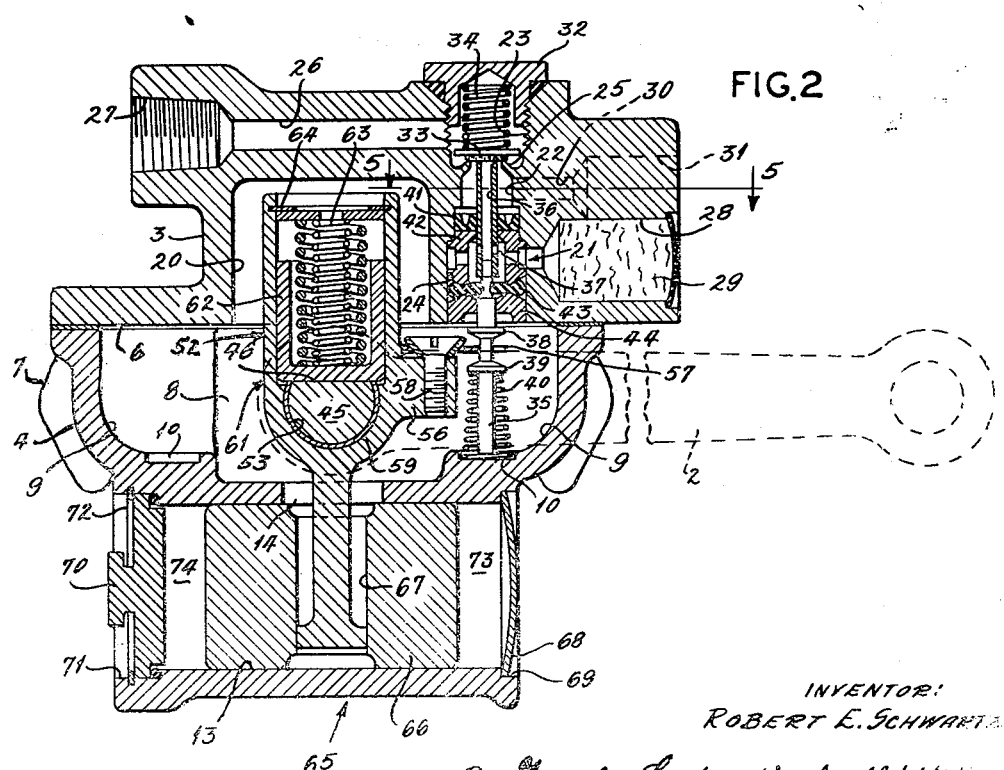
Fig. 2 is a sectional view taken along the line 2—2 of Fig. 1 showing the preferred embodiment in cross-section.
Figure 4:
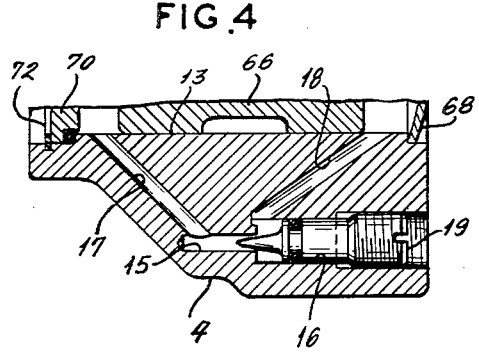
Fig. 4 is a partial sectional view taken along the line 4—4 of Fig. 3.

The lower housing 4 is provided with a chamber 8 which serves as a liquid reservoir and has valve stem receiving chambers or key type slots 9 integrally formed on each end thereof, and spring retaining recesses 10 are provided in the lower end of said key type slots. The central portion of the housing 4 is provided with a cross-bore 11 which intersects the chamber 4 and is axially aligned with a counterbore 12; and, the lower end of the chamber 8 is connected with the mid-portion of a damping bore 13 by an opening 14. In order to adjust the degree of damping in the height control valve 1, as will be fully discussed hereinafter, an axially aligned bore 15 and counterbore 16, Figs. 2 and 4, are horizontally spaced from the damping bore 13, and a passage 17 connects one end of said damping bore with the bore 15 while another passage 18 connects the other end of said damping bore with the counterbore 16 adjacent the shoulder formed by the juncture of the bore 15 and counterbore 16. In this manner, a seal carrying needle valve 19 which is threadedly received in the counterbore 16 is predeterminately positioned to restrict fluid flow through the passages 17 and 18.

Figure 3:
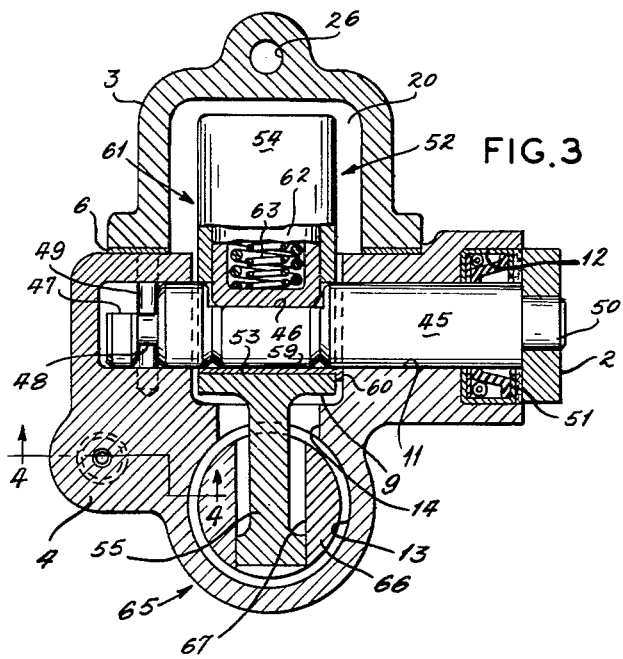
Fig. 3 is a sectional view taken along the line 3—3 of Fig. 1 showing the preferred embodiment in cross-section.
Figure 5:
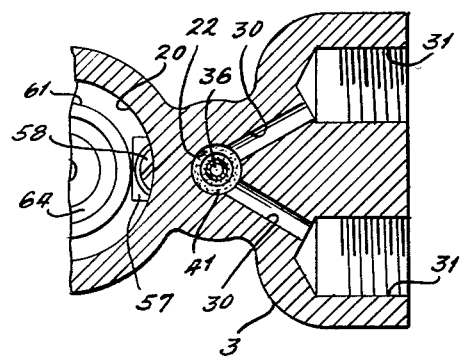
Fig. 5 is a partial sectional view taken along the line 5—5 of Fig. 2.

Referring now to Figs. 2 and 3, the upper housing 3 of the leveling valve 1 is provided with spaced vertical chambers 20 and 21, respectively, adapted to open into and overlap the chamber 8 and one of the key slots 9 of the lower housing 4. The chamber 21 serves as a valve chamber and comprises a bore 22 axially interposed between a counterbore 23, which intersects the upper extremity of the housing 3, and a stepped counterbore 24 while a valve seat 25 is integrally formed between the bore 22 and counterbore 23. A horizontal passage 26 is interposed between the mid-portion of the counterbore 23 and an inlet port 27 which is adapted for connection with a fluid pressure source (not shown), and an exhaust port 28, having a filter assembly 29 positioned therein to prevent the entry of foreign particles, intersects the larger portion of the stepped counterbore 24 adjacent the shoulder formed therein. As shown in Fig. 5, the valve chamber bore 22 is connected by angular passages 30 to spaced working, or outlet, ports 31 which are adapted for connection with a fluid pressure actuable device, such as the previously mentioned pneumatic spring (not shown).

Referring now to Figs. 1, 2, and 3, an end cap and seal assembly 32 is threadedly received in and closes the upper end of the counterbore 23, and an inlet valve 33 is normally biased into sealable engagement with the cooperating valve seat 25 by a spring 34 interposed between said assembly and inlet valve. A valve stem 35, having a tubular exhaust passage 36 and cross-passage 37 in the upper portion thereof, extends coaxially through the valve chamber 21 and protrudes into the lower housing key slot 9 having spaced hubs 38 and 39 integrally formed on the lower portion thereof for "neutral travel" purposes (to be discussed hereinafter). A spring 40 is interposed between the lower valve stem hub 39 and the key slot recess 10 normally biasing the upper end of the stem 35 into sealable engagement with the inlet valve 33 thereby closing the tubular exhaust passage 36 and cross-passage 37. A high pressure, sealing cup 41 is sealably interposed between the periphery of the stem 35 and the wall of the smaller portion of the stepped counterbore 24 and is seated by an upper valve guide member 42 positioned in abutment with the shoulder formed in said stepped counterbore. A diaphragm type seal, or low pressure seal 43, carried by the stem 35 near the mid-portion thereof, is sealably interposed between said stem and the large portion of the stepped counterbore 24 and is abuttingly interposed between the upper valve guide member 42 and a cooperating lower valve guide member 44. To prevent displacement of the various parts in the valve chamber 21, the lower valve guide member 44 is seated on the upper surface of the housing 4 where the valve chamber 21 overlaps the key slot 9. As described above, the inlet valve 33 normally interrupts communication between the inlet port 27 and the outlet ports 31, and the sealable engagement between said inlet valve and the upper end of the valve stem 25 closes the exhaust passage 36 and cross-passage 37 normally interrupting communication between said outlet ports and the exhaust port 28.

The lower housing cross-bore 11 rotatably receives a shaft 45 having a flat 46 near its mid-portion and another flat 47 on its inward end with a groove 48 adjacent thereto. A pin 49 is fixedly positioned in the cross-bore 11 and rotatably receives the shaft groove 48 forming a bayonet type locking means retaining said shaft against displacement from said cross-bore. The pin 49 also serves as a thrust bearing absorbing any thrust forces applied to said shaft by the actuating lever 2 which is fixedly received by a reduced portion 50 on the outward end of said shaft; and, a seal assembly 51 positioned in the counterbore 12 seals the shaft preventing the loss of liquid from the chamber 8 and obviating the entry of foreign particles into the cross-bore 11.

An oscillatable member or lever 52 is provided with a bore 53 and an integral tubular portion 54 which extends vertically into the upper housing chamber 20. The lever 52 is also integrally provided with a damping arm 55 which extends vertically through the opening 14 into the damping bore 13 and a horizontally extending hub portion 56 to which one end of a valve stem actuating arm 57 is attached by suitable means, such as the screw 58, while the fingers of the other end thereof are juxtaposed between the valve stem hubs 38 and 39. The distance the actuating arm 57 must move before abutting either of the hubs 38 and 39 is the predetermined "neutral travel" provided to obviate unwarranted movement of the stem 35 and provide a time delayed operating range for the control valve 1. The lever bore 53 rotatably receives the portion of the shaft 45 on which the flat 46 is formed, and a half bearing 59 is suitably interposed therebetween having a depending flange 60 on one end thereof serving as a thrust bearing and journaling between the oscillatable lever 52 and a wall of the lower housing chamber 9.

To secure the lever 52 to the shaft 45, so that under certain conditions the lever 52 will oscillate with the shaft and under other conditions the shaft 45 may oscillate relatively to the lever, there is provided a yieldable torque connection 61. This torque connection 61 comprises a plunger 62 slidable in the tubular portion 54 of the oscillatable lever 52 and normally urged into yieldable engagement with the flat 46 on the shaft 45 by the predetermined compressive force of a spring assembly 63 retained in said tubular portion against displacement by a snap ring 64 carried in the upper end of said tubular portion. In this manner, the yieldable torque connection 61 exerts a relatively constant force to move the lever 52 with the shaft 45.

In order to actuate the height control valve 1 only in response to a predeterminately slow relative movement between the aforementioned sprung and unsprung masses and obviate actuation due to the more rapid and of less amplitude movements of said masses caused by road conditions, the height control valve 1 is provided with a damping mechanism 65 which, combined with the yieldable connection 61 between the shaft 45 and lever 52, affords a time delay permitting said leveling valve to be actuated at slow relative movements of the sprung and unsprung masses and obviates actuation at the faster movements thereof. This damping mechanism 65 comprises a piston 66 slidable in the damping bore 13 and provided with a vertical slot 67 therethrough in which the lower end of the oscillatable lever damping arm 55 is received. The ends of the damping bore 13 are closed by a welch plug 68 pressed into a recess 69 at one end and a seal carrying closure member 40 positioned in a recess 71 in the other end by a snap ring 72. In this manner, displacement chambers 73 and 74 are formed between the opposed ends of the damping piston 66 and the welch plug 68 and closure member 70, respectively. As described above, the oscillatable lever 52 is mechanically connected to the reciprocative damping piston 66 of the damping mechanism 65 whereby tilting movement of said lever is transmitted to the damping piston 66 causing it to displace fluid from one displacement chamber to the other via the predeterminately restricted passages 17 and 18.

*Operation*

Assuming that the sprung mass, or frame of the vehicle, is at a predetermined distance from the unsprung mass, or axle, of the vehicle, the sprung mass is moved downwardly when the vehicle load is increased thereby moving the control arm 2 in a counterclockwise direction. In this manner the shaft 45 is also rotated in a counterclockwise direction; and, since the yieldable connection 61 exerts a relatively constant force to rotate or move the tiltable member 52 with the shaft 45, a relatively constant force is also imparted to the damping arm 55 to move the piston 66 rightward in the damping bore 13. This movement displaces fluid from the displacement chamber 73 through the restricted passages 17 and 18 into the displacement chamber 74 affording a predetermined time delay before the valve actuating arm 57 is moved through its "neutral travel" into abutment with the upper hub 38 on the valve stem 35. Further movement of the actuating arm 57 moves the valve stem 35 upwardly to open the inlet valve 33 against the compressive force of the spring 34 thereby affording pressure fluid communication between the inlet 27 and working ports 31 to inflate the pneumatic springs (not shown). As these pneumatic springs are inflated, the sprung mass is raised to the aforementioned predetermined distance above the unsprung mass which results in a consequent, clockwise rotation of the control arm 2 and shaft 45. In this manner, the lever 52 and parts associated therewith are returned to their original positions, and the compressive force of the spring 34 reseats the inlet valve 33 and returns the valve stem 35 to its original position.

In the event the vehicle load is lessened, the sprung mass is moved upwardly resulting in an increased distance between the sprung and unsprung masses greater than the predetermined distance; consequently, the control arm 2 and shaft 45 are rotated in a clockwise direction, and the relatively constant force applied by the yieldable torque connection 61 causes the tiltable lever 52 to move or rotate with said shaft. As a result, a relatively constant force is also imparted to the damping arm 55 moving the piston 66 leftwardly in the damping bore 13, and this movement displaces pressure fluid from the displacement chamber 74 into the chamber 73 through the restricted passages 17 and 18 affording the necessary time delay before the valve actuating arm 57 is moved through its "neutral travel" into abutment with the lower hub 39 on the valve stem 35. Further movement of the actuating arm 57 moves the valve stem downwardly against the compressive force of the spring 40. In this manner the upper end of the valve stem 35 is disengaged from the inlet valve 33 thereby affording pressure fluid communication between the working ports 31 and exhaust port 28 via the valve chamber bore 22 and the tubular exhaust passage 36 and cross-passage 37 in the upper portion of the valve stem 35. As the pneumatic springs are deflated, the spring mass is lowered to the aforementioned predetermined distance above the unsprung mass which results in a consequent counterclockwise rotation of the control arm 2 and shaft 45. In this manner, the lever 52 and parts associated therewith are returned to their original positions, and the compressive force of the spring 40 returns the valve stem 35 to its original position sealably re-engaging the upper end thereof with the inlet valve 33 to close the valve stem exhaust passage 36 and again interrupt communication between the working ports 31 and the exhaust port 28.

As described above, slow relative movement between the sprung and unsprung masses causes a force to be applied to the damping piston 66 for a sufficient time to effect operation of the valve stem 35; however, insufficient time is allowed for valve stem operation due to more rapid and of less amplitude movements between said masses caused by road conditions. Since the damping piston 66 moves at a predetermined rate due to the desired degree of damping obtainable, the rotational rate or angular velocity of the lever 52 is also limited to this predetermined rate; therefore, if the torque input of the rapidly moving control arm 2 and shaft 45 tends to rotate the lever 52 at a rate greater than the above-mentioned predetermined rate, the torque connection 61 yields, and the plunger 62 is moved upwardly by the shaft 45 against the compressive force of the spring assembly 63. In this manner, the yieldable torque connection 61 obviates movement of the lever 52 due to rapid movements of the control arm 2, and said lever and damping mechanism 65 remain substantially stationary under these conditions.

It is apparent that a predetermined load increase or decrease on the sprung mass is permitted due to the "neutral travel" of the valve stem actuating arm 57 which provides an operating range and obviates immediate actuation of the control valve 1. This "neutral travel" is the angle through which the actuating arm 57 must move before it abuts against either of the valve stem hubs 38 and 39. As a result, quick loading and unloading of the vehicle will not cause actuation of the height control valve 1, and this delayed "neutral travel" also obviates actuation of said height control valve if slight movements are imparted to the lever 52 during the above-mentioned high rate movements of the control arm 2.

In addition to having the predetermined "neutral travel" machined into the valve stem 35, it is also apparent that the valving controlling the inlet, working, and exhaust ports precludes the need for minute manual valve adjustments to establish this rather precise "neutral travel" distance. The valve stem 35 and parts associated therewith in the valve chamber 21 are self-aligning with reference only to said valve chamber which is most conducive to maintenance and repair. Further, the valve stem 35 is automatically positioned vertically in the valve chamber 21 by the opposing compressive forces of springs 34 and 40.

It is also apparent that the valve and porting combination in the chamber 21 obviates high pressure seals between the pneumatic and hydraulic portions thereof, that is the exhaust port 28 which is at atmospheric pressures is interposed between the high pressure inlet and working ports 27 and 31 and the hydraulic portion, or chambers 8 and 20, of the valve 1. As a result, the possibility of high pressure air entering the chambers 8 and 20 is precluded, and the diaphragm type seal 43 can be utilized between the exhaust portion of the chamber 21 and the chamber 8. In view of the above, precluding the entry of high pressure air into the chamber 8 not only preserves the integrity of the damping mechanism 65 but also enhances the life of the bearing 59, the bearing seal 51, and the fluid reserve.

Among the obvious advantages of the present invention are the ease of assembly and the simplicity of manufacture. The height control valve 1 is also provided with the feature of adaptability to left or right hand use. By merely rotating the upper housing 3 one hundred and eighty degrees (180°) and reversing the position of the control arm 2, the height control valve 1 is converted from left hand use, as shown, to right hand use.

Figure 6:
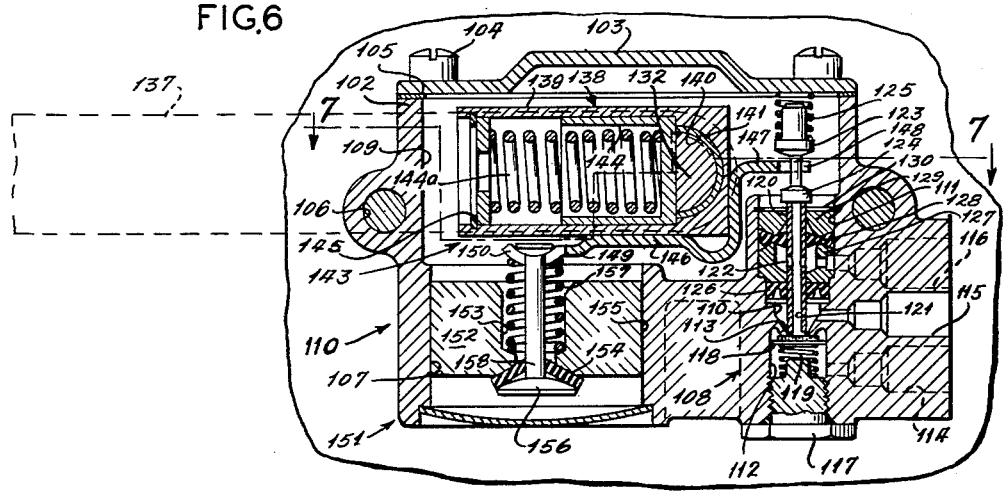
Fig. 6 is a sectional view taken along the line 6—6 of Fig. 7 showing the modification of the preferred embodiment in cross-section.
Figure 7:
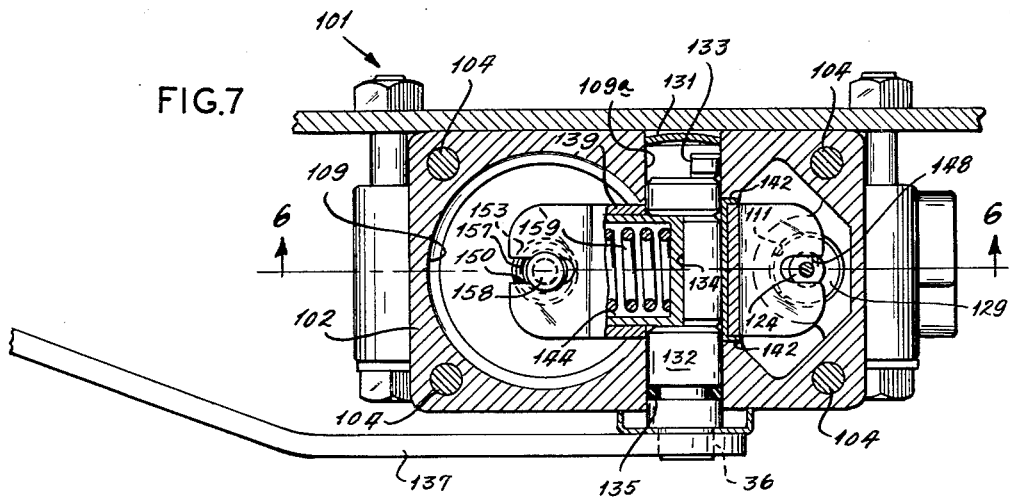
Fig. 7 is a sectional view taken along the line 7—7 of Fig. 6 showing the modification of the preferred embodiment in cross-section.

Referring to Figs. 6 and 7, the modification of the preferred embodiment comprises a height control valve 101 having a housing 102 to which a cover plate 103 is attached by suitable means, such as studs 104, with a gasket 105 sealably interposed therebetween; and, a plurality of through bolt holes 106 are provided in said housing for mounting purposes.

The housing 102 is provided with a damping bore 107 and a valve chamber 108, which is horizontally spaced therefrom, each having one of their ends intersecting an upper chamber or liquid reservoir 109 while the other ends thereof intersect the lower extremity of said housing. A cross bore 109a is also provided through the housing 102 intersecting the upper chamber 109 near the mid-portion thereof.

The valve chamber 108 comprises a bore 110 axially interposed between upper and lower counterbores 111 and 112, respectively, and an integrally formed valve seat 113 is provided between the tapered portion of the bore 110 and the lower counterbore 113. An inlet port 114 is adapted for connection with the pressure source intersects the lower counterbore 112 near the mid-portion thereof while an outlet or working port 115 adapted for connection with the pneumatic springs intersects the tapered portion of the bore 110, and an exhaust port 116 intersects the upper counterbore 111 adjacent its juncture with the bore 110.

An end cap and seal assembly 117 is threadedly received in and closes the lower end of the counterbore 112, and an inlet valve 118 is normally biased into sealable engagement with the cooperating valve seat 113 by a spring 119 interposed between said assembly and inlet valve. A valve stem 120, having a tubular exhaust passage 121 and cross-passage 122 in the lower portion thereof, extends axially through the valve chamber 108 and protrudes into the upper chamber 106 with spaced hubs 123 and 124 integrally formed on the upper portion thereof for "neutral travel" purposes. A spring 125 is interposed between the upper valve stem hub 123 and the cover plate 103 normally biasing the lower end of the stem 35 into sealable engagement with the inlet valve 118 thereby closing the exhaust passage 121 and cross-passage 122. A sealing cup 126 is sealably interposed between the periphery of the stem 120 and the wall of the valve chamber bore 110 and is seated by a lower valve guide member 127 positioned in abutment with the shoulder formed at the juncture of said bore and the counterbore 111. Another seal 128 is sealably interposed between the stem 120 and the wall of the counterbore 111 and is abuttingly interposed between the lower valve guide 127 and an upper valve guide member 129 which is retained against displacement from the counterbore 111 by a snap ring 130 carried adjacent the upper end thereof. As described above, the inlet valve 118 normally interrupts communication between the inlet port 114 and outlet port 115, and the sealable engagement between said inlet valve and the lower end of the stem 120 normally interrupts communication between the outlet port 115 and exhaust port 116.

An end of the housing cross bore 109a is closed by a welch plug 131 and a shaft 132 is rotatably received therein extending through the upper chamber 109. The shaft 132 is provided with a flat 133 on its inward end for assembly purposes, another flat 134 near its midportion, and carries an O-ring 135 adjacent its outer end for sealable engagement with the cross bore 109a, said outer end having a reduced portion 136 thereon on which is fixedly received a control arm 137.

An oscillatable member or lever 138 is provided with a tubular portion 139, one end of which is intersected by a cross bore 140, which rotatably receives the portions of the shaft 132 having the flat 134 thereon, and a half bearing 141 is interposed between said shaft and cross bore on the load carrying side of said shaft, said bearing 141 also having depending side edges 142 which serve as thrust bearings journalled between said lever and the side walls of the upper chamber 109 adjacent the bore 109a. To secure the lever 138 to the shaft 132, so that under certain conditions said lever will oscillate with said shaft and under other conditions said shaft will oscillate relatively to said lever, there is provided a yieldable torque connection 143. This torque connection 143 comprises a piston 144 slidable in the tubular portion 139 of the lever 138 and normally urged into yieldable engagement with the flat 134 on the shaft 132 by the predetermined compressive force of a spring assembly 144a retained in said tubular portion against displacement therefrom by a snap ring 145 carried in the open end of said tubular portion.

A tongue 146, carried by the oscillatable member 138, has one end which forms an integral control arm 147 having a slot 148 therein while the other end thereof forms an integral damping arm 149 having a slot 150 therein. The control arm 147 extends horizontally from the oscillatable member 138 whereby the valve stem 120 is received in the slot 148 so that said control arm is juxtaposed with and adapted for abutment with the spaced valve stem hubs 123 and 124. The damping arm 149 extends horizontally along the lower portion of the oscillatable member 138 and is adapted to control a damping mechanism 151. The damping mechanism 151 comprises a piston 152 slidably received in the bore 107 and having a vertical bore 153 therethrough with a seat 154 formed at the lower end of said vertical bore, said piston also having a restricted passage 155 between its faces. A knuckle joint 156 is always biased into sealable engagement with the cooperating seat 154 either by the compressive force of a spring 157 interposed between said seat and the damping arm 149 or by the pressure differential across the piston 152, said knuckle joint having an integral stem 158 extending coaxially through the vertical bore 153 with the upper end thereof retained in the control arm slot 150. Therefore, the knuckle joint 156 is merely a connecting link between the arm 149 and the piston 152 providing a simplified means of assembly.

The modified height control valve 101 functions exactly as the preferred embodiment with the exception of the damping mechanism 151 which has the same effect albeit of different construction. When the lever 138 tilts in one direction the damping arm 149 compresses the spring 157 forcing the damping piston 152 downward in the bore 107 and allowing fluid flow through the restricted passage 155 to effect damping. When the lever 138 tilts in the other direction the damping arm 149 pulls the knuckle joint 156 further into sealable engagement with the seat 154 forcing the damping piston 152 upward in the bore 107 which allows fluid flow through the restricted passage 155 to effect damping.

Thus, it is apparent that there has been provided a novel height control valve for a vehicle pneumatic suspension system which fulfills all the objects and advantages sought therefor. It is to be understood, however, that the foregoing description and the accompanying drawings have been presented only by way of illustration and example and that changes, alterations, and modifications of the present disclosure which will be readily apparent to one skilled in the art are contemplated as being within the scope of the present invention which is limited only by the claims which follow.

What is claimed is as follows:

1. In a height control valve including a housing having inlet, outlet and exhaust ports and a normally closed valve controlling communication between said inlet and outlet ports, a unitary valve stem adapted to actuate said valve, an exhaust passage through one end of said valve stem controlling communication between said outlet and exhaust ports, spaced projections adjacent to the other end portion of said unitary valve stem, spring means in abutment with one of the projections urging said valve stem into sealable engagement with the valve to close said exhaust passage, a shaft rotatably mounted in said housing, a lever carried on said shaft and movable therewith, predeterminately yieldable means normally effecting concert movement between said shaft and lever, movement damping means connected with said lever and effective to cause said yieldable means to yield at predetermined angular velocities of said shaft, a control arm carried by said lever and normally juxtaposed between the projections whereby movement of said lever moves the control arm into contact with one or the other of the projections to move said valve stem in a valve opening direction and open communication between said inlet and outlet ports or in an exhaust passage opening direction and open communication between said outlet and exhaust ports.

2. In a height control valve including a housing having inlet, outlet, and exhaust ports, valve means for controlling communication between said inlet and outlet ports, a valve stem having an exhaust passage therein for controlling communication between said outlet and exhaust ports, spaced projections adjacent to the other end of said unitary valve stem, said valve stem being normally biased into sealable engagement with said valve means closing said exhaust passage, a shaft rotatably mounted in said housing, said shaft having a flat thereon, a lever having a tubular extension thereon connected to said shaft, said lever and said valve stem normally being in substantially spaced parallel relation, a plunger yieldably mounted in said tubular extension above and against said flat on said shaft, said plunger having a spring assembly therein, a damping arm connected to said lever extending in the opposite direction from said tubular extension, movement damping means in contacting relation with said damping arm on said lever, said plunger and said damping means allowing relative movement between said shaft and said lever upon a predetermined rotating velocity of said shaft, and a single connection between said lever and said spaced projections on said valve stem whereby movement of said lever in one direction opens communication between said inlet and outlet and in the other direction opens communication between said outlet and exhaust ports.

References Cited in the file of this patent

UNITED STATES PATENTS

| | | |
|---|---|---|
| 1,834,634 | Nash | Dec. 1, 1931 |
| 2,171,316 | Van Sittent | Aug. 29, 1939 |
| 2,588,798 | Bone | Mar. 11, 1952 |
| 2,670,201 | Rossman | Feb. 23, 1954 |
| 2,733,931 | Reid | Feb. 7, 1956 |

FOREIGN PATENTS

| | | |
|---|---|---|
| 766,444 | Great Britain | of 1957 |